(12) United States Patent
Hsu et al.

(10) Patent No.: US 11,687,234 B2
(45) Date of Patent: Jun. 27, 2023

(54) COMPUTER SYSTEM AND INPUT DEVICE THEREOF

(71) Applicant: ASUSTeK COMPUTER INC., Taipei (TW)

(72) Inventors: Ching-Fu Hsu, Taipei (TW); Wei-Ting Wong, Taipei (TW); Teng-Hui Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/548,668

(22) Filed: Dec. 13, 2021

(65) Prior Publication Data

US 2022/0100369 A1   Mar. 31, 2022

Related U.S. Application Data

(62) Division of application No. 16/792,561, filed on Feb. 17, 2020, now Pat. No. 11,231,851.

(30) Foreign Application Priority Data

Feb. 26, 2019   (TW) ................................. 108106572

(51) Int. Cl.
*G06F 3/04886* (2022.01)
*G06F 3/044* (2006.01)
*G06F 1/16* (2006.01)
*G06F 3/041* (2006.01)

(52) U.S. Cl.
CPC ........ *G06F 3/04886* (2013.01); *G06F 1/1669* (2013.01); *G06F 3/0416* (2013.01); *G06F 3/0443* (2019.05); *G06F 1/1616* (2013.01); *G06F 2203/04107* (2013.01)

(58) Field of Classification Search
CPC .. G06F 3/0412; G06F 3/03547; G06F 3/0416; G06F 3/0443
See application file for complete search history.

(56) References Cited

U.S. PATENT DOCUMENTS

| 4,685,638 | A | 8/1987 | Satoyoshi et al. |
| 8,578,192 | B2 * | 11/2013 | Vasquez ................... G09G 3/36 345/212 |
| 10,353,437 | B1 | 7/2019 | Kitamura et al. |
| 2007/0195512 | A1 | 8/2007 | Konno |

(Continued)

FOREIGN PATENT DOCUMENTS

| CN | M387312 U1 | 8/2010 |
| CN | 203386107 U | 1/2014 |

*Primary Examiner* — Van N Chow
(74) *Attorney, Agent, or Firm* — McClure, Qualey & Rodack, LLP (57) ABSTRACT

A computer system including an electronic device and an input device is disclosed. The electronic device includes a touch display area and a control unit. The input device includes a plurality of positioning structures and a grounding piece. The positioning structures are electrically connected to the grounding piece. When the input device is disposed on the touch display area of the electronic device, the control unit detects positions of the positioning structures on the touch display area, calculates a coverage area covered by the input device on the touch display area according to the positions, and determines a range of a display area of the touch display area according to the coverage area.

6 Claims, 6 Drawing Sheets

(56) References Cited

U.S. PATENT DOCUMENTS

| | | |
|---|---|---|
| 2017/0024029 A1 | 1/2017 | Kitamura et al. |
| 2017/0102792 A1 | 4/2017 | Aoki et al. |
| 2018/0254540 A1 | 9/2018 | Yoo et al. |
| 2020/0097094 A1* | 3/2020 | Sawaguchi ............ G06F 3/0412 |
| 2020/0249726 A1* | 8/2020 | Brocklesby .......... H02G 11/003 |
| 2021/0132735 A1* | 5/2021 | Yoshida ................ G02F 1/1345 |

* cited by examiner

FIG. 7

COMPUTER SYSTEM AND INPUT DEVICE THEREOF

CROSS-REFERENCE TO RELATED APPLICATION

The present application is a Divisional Application of the U.S. application Ser. No. 16/792,561, filed Feb. 17, 2020, now U.S. Pat. No. 11,231,851, which claims priority to Taiwan Application Serial Number 108106572, filed Feb. 26, 2019, which is herein incorporated by reference in their entirety.

BACKGROUND OF THE INVENTION

Field of the Invention

The invention relates to a computer system, especially, to a computer system with an input device.

Description of the Related Art

In general, a notebook or tablet computer usually equips with only one screen, and a virtual keyboard displayed on the screen for information input. However, when the virtual keyboard displayed on the smaller screen such as on a tablet, it occupies part of the display area of the screen and caused inconvenient while using.

BRIEF SUMMARY OF THE INVENTION

According to the first aspect of the disclosure, a computer system including an electronic device and an input device is disclosed. The electronic device includes a touch display area and a control unit. The input device includes a plurality of positioning structures and a grounding piece. The positioning structures are electrically connected to the grounding piece. When the input device is disposed on the touch display area of the electronic device, the control unit detects positions of the positioning structures on the touch display area, calculates a coverage area covered by the input device on the touch display area according to the positions, and determines a range of a display area of the touch display area according to the coverage area.

According to the second aspect of the disclosure, an input device applied in an electronic device is disclosed. The input device includes a casing, an input assembly, and a plurality of positioning structures. The casing includes a grounding piece. A wireless transmission unit is disposed in the casing. The input assembly is disposed on the casing. The positioning structures are disposed at a side of the casing opposite to the input assembly, protruded from the casing, and electrically connected to the grounding piece.

From the above detailed description of the specific embodiments, it is obvious that the positioning structures of the input device are electrically connected to the grounding piece of the input device, thereby, the problem of poor recognition ability caused by the floating effect of the positioning structure is improved. When the input device is placed on the touch display device, the change of capacitance on the touch sensing layer caused by the improved positioning structures is relatively stable, so that the control unit in the touch display device accurately determines the position of the positioning structure on the touch display device. Therefore, when the input device is close to the touch display device, the control unit can determine the position where the input device is placed by the positioning structure.

In addition, the input device can be disposed on a specific position of the touch display device by the fixing structures located thereon to prevent the input device being moved relative to the touch display device when the user uses the touch display device or the input device. Furthermore, the user can also place the input device on a specific position of the touch display device as his required, so as to improve the convenience of the computer system.

These and other features, aspects and advantages of the present invention will become better understood with regard to the following description, appended claims, and accompanying drawings.

DETAILED DESCRIPTION OF THE EMBODIMENTS

Spatially relative terms such as "below", "underneath", "under", "above," "top", and the like, are used herein to facilitate describing the relationship of one element or feature to another element or feature in the figure. The spatially relative terms, in addition to the orientations depicted in the figures, further encompass other orientations of the device as it is used or manipulated. That is to say, when the orientation of the device is different from the figures (90 degrees rotation or in other orientations), the spatial relative terms used in this document can also be interpreted accordingly.

Figure 1:
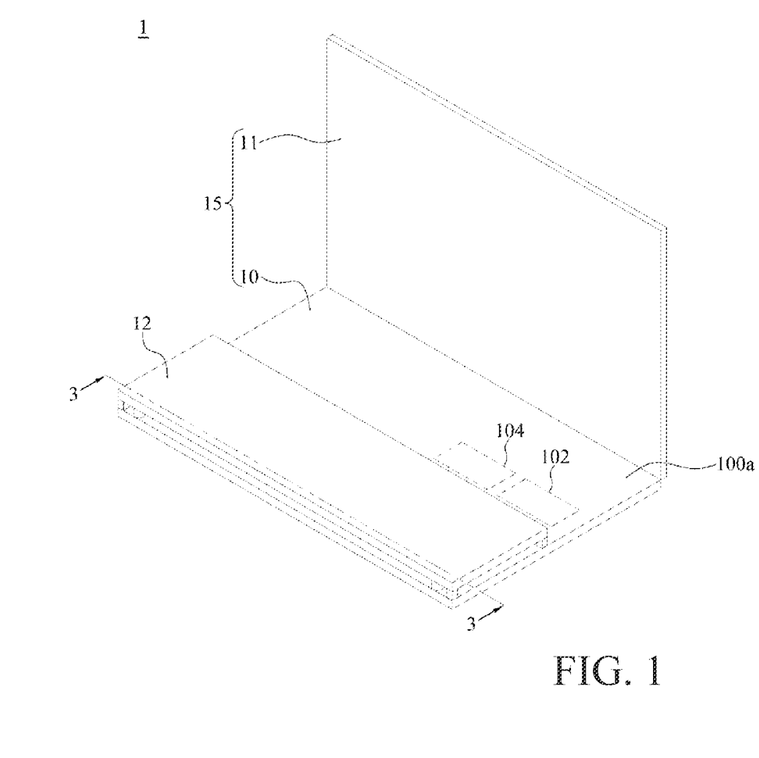
FIG. 1 is a perspective view of a computer system in an assembled state according to an embodiment.
Figure 2:
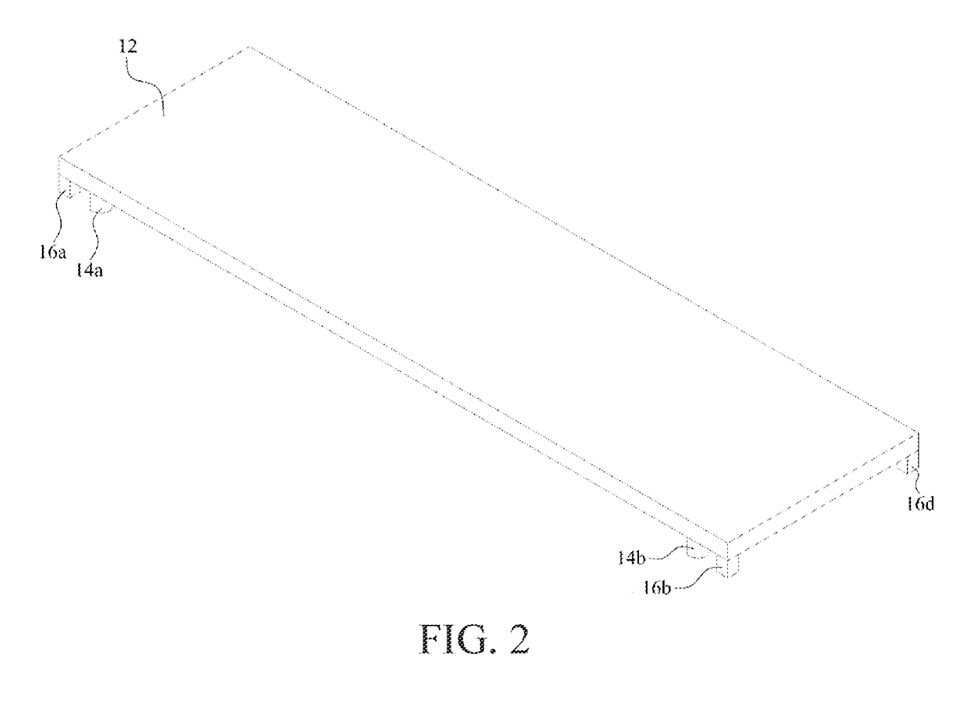
FIG. 2 is a perspective view of an input device according to an embodiment.

Please refer to FIG. 1 and FIG. 2. FIG. 1 is a perspective view of a computer system in an assembled state according to an embodiment of the present disclosure. FIG. 2 is a perspective view of an input device according to an embodiment of the present disclosure.

Figure 3:
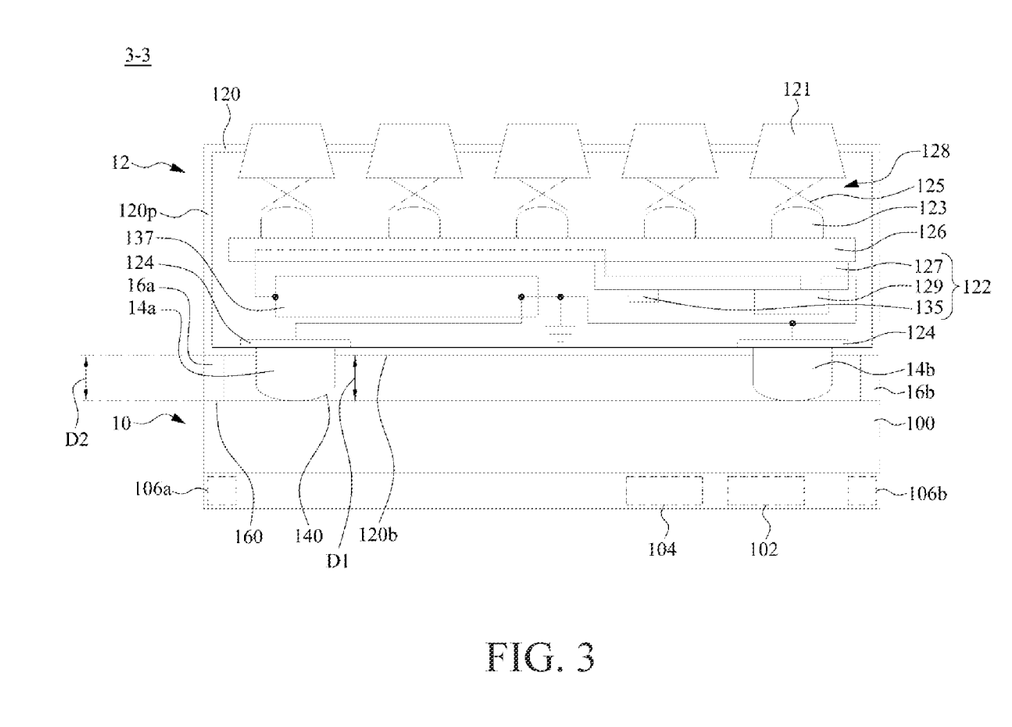
FIG. 3 is a cross-sectional view of the structure shown in FIG. 1 along line 3-3.

As shown in FIG. 1 and FIG. 3, the computer system 1 includes an input device 12 and an electronic device 15. The electronic device 15 includes a first body 10 and a second body 11 pivotally connected to each other. In this embodiment, the first body 10 and the second body 11 are touch display devices, such as a capacitive touch display device. In an embodiment, the first body 10 includes a touch display area 100, a wireless transmission unit 102, and a control unit 104. The touch display area 100 has a display function and a touch sensing function. In other embodiments, any suitable device can be applied to the body. In this embodiment, the computer system 1 is a notebook computer, which is not limited thereto.

Figures 4A, 4B, 4C:
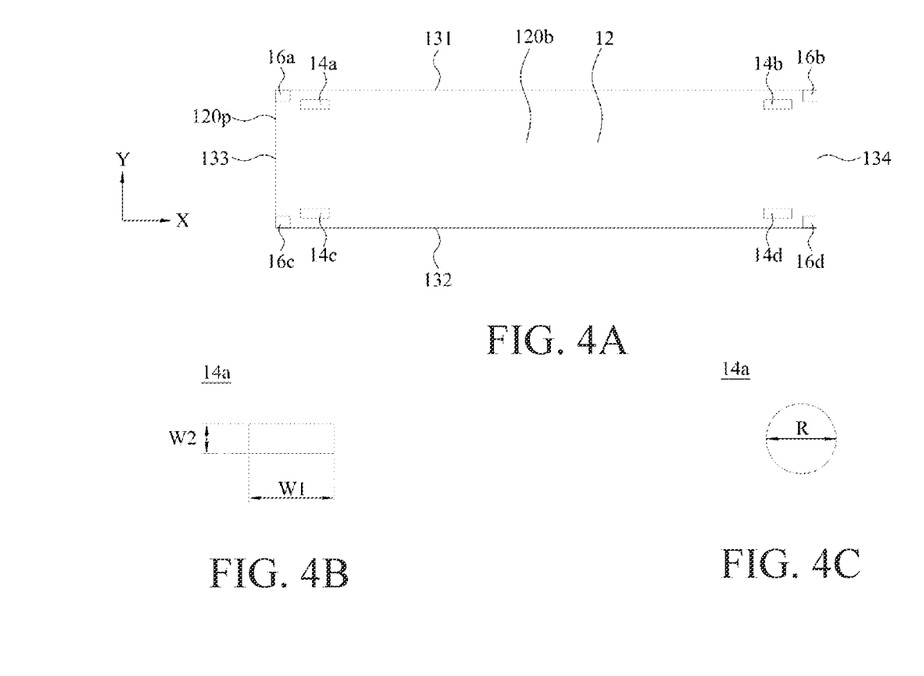
FIG. 4A is a bottom view of the structure shown in FIG. 2.
FIG. 4B is a perspective view of a positioning structure according to an embodiment.
FIG. 4C is a perspective view showing a positioning structure according to another embodiment.

As shown in FIG. 1 and FIG. 2, the computer system 1 also includes the input device 12 (see FIG. 1). The input device 12 includes a plurality of positioning structures and a plurality of fixing structures. The input device 12 is placed on the touch display area 100 of the first body 10 and partially cover the touch display area 100 of the first body 10. As shown in FIG. 2, in the present embodiment, the number of the positioning structures is four, that is, the positioning structures 14a, 14b, 14c, and 14d, but the number of the positioning structures is not limited thereto. The positioning structures 14c and 14d as shown in FIG. 4A are not shown in the perspective of FIG. 2. In the present embodiment, the number of the fixing structures is four, that is the fixing structures 16a, 16b, 16c, and 16d, but the number of the fixing structure is not limited thereto. The fixing structure 16c as shown in FIG. 4A is not shown in the perspective of FIG. 2.

In some embodiments, the positioning structures 14a, 14b, 14c, and 14d are conductive rubbers containing conductive material.

In some embodiments, the fixing structures 16a, 16b, 16c, and 16d are any structures configured to fix the input device 12 to the first body 10. For example, the fixing structures 16a, 16b, 16c, and 16d are attractive elements. In an embodiment, the material of the fixing structures 16a, 16b, 16c, and 16d include a magnetic material (such as a magnet) or a metal material, but which is not limited thereto.

Please refer to FIG. 3. FIG. 3 is a cross-sectional view of the structure shown in FIG. 1 along line 3-3. In an embodiment, the touch display area 100 of the first body 10 includes a liquid crystal display (LCD), which is not limited herein. In other embodiment, the touch display area 100 is an organic light-emitting diode (OLED) display.

In this embodiment, the first body 10 of the touch display area 100 includes a capacitive sensing element. The capacitive sensing component is configured to determine whether a conductor is present on the first body 10 to generate a touch sensing signal for the touch display area 100. The capacitive sensing element includes at least one of an electrode or a wire. When the conductor is close to the touch display area 100 of the first body 10, a capacitance is formed between the conductor and the electrode/wire of the touch display area 100. The control unit 104 determines whether a conductor is present on the touch display area 100 by detecting a change of capacitance at each electrode/wire.

In FIG. 3, the input device 12 includes a casing 120, an input assembly 128, a first circuit board 126, a wireless transmission unit 122, a plurality of positioning structures 14a, 14b, 14c, 14d, and a plurality of fixing structures 16a, 16b, 16c, 16d, and a power supply 137. The input assembly 128 is disposed in the casing 120. In some embodiments, the casing 120 of the input device 12 is used as the grounding piece.

In the embodiment, the input assembly 128 includes a keycap 121, a conductive elastic element 123, and a lifting guide element 125. The conductive elastic element 123 is disposed on the first circuit board 126. The lifting guide element 125 of the input assembly 128 is located between the keycap 121 and the first circuit board 126, such that the keycap 121 moves relative to the first circuit board 126. The lifting guide element 125 of the input assembly 128 in the embodiment is a scissor support structure, which is not limited thereto. When the keycap 121 of the input assembly 128 is pressed, the lifting guide element 125 changes from an open state to an overlapped state. Next, the keycap 121 gradually approaches the first circuit board 126 to contact the conductive elastic element 123 to transfer the pressure from the keycap 121 to the first circuit board 126, causing the first circuit board 126 to be pressurized and electrically conducted to pass the signal.

In the embodiment, the wireless transmission unit 122 includes a second circuit board 127, a transfer chip 129, and an antenna 135. The second circuit board 127 of the wireless transmission unit 122 is disposed on a side of the first circuit board 126 opposite to the input assembly 128, and electrically connected to the first circuit board 126. The transfer chip 129 and the antenna 135 are respectively disposed on the second circuit board 127. The wireless transmission unit 122 of the input device 12 is configured to transmit signals to the wireless transmission unit 102 of the first body 10 as shown in FIG. 1, for transmitting user instructions from the input device 12 to the first body 10. In this embodiment, the wireless transmission units 102 and 122 are Bluetooth communication units, which is not limited thereto.

In an embodiment, the power supply 137 provides power to the first circuit board 126 and the wireless transmission unit 122. The wireless transmission unit 122 of the input device 12 and the power supply 137 are electrically connected to the grounding piece 124. The first circuit board 126 of the input device 12 is electrically connected to the grounding piece 124 by the wireless transmission unit 122 and the power supply 137.

In FIG. 3, the positioning structures 14a, 14b are disposed on the casing 120 of the input device 12 and protruding from the casing 120. In addition, the positioning structures 14a, 14b are disposed on a side of the input device 12 opposite to the input assembly 128. In other words, the positioning structures 14a, 14b protrude from the side of the input device 12 opposite to the input assembly 128. In the embodiment, the positioning structure 14a protrudes from the surface 140 of the input device 12, which is not limited thereto.

In an embodiment, the positioning structures 14a, 14 are electrically connected to the grounding piece 124 of the input device 12, whereby the floating effect of the positioning structures 14a, 14b is reduced. When the input device 12 is placed on the touch display area 100 of the first body 10, the change of capacitance on the touch display area 100 caused by the positioning structures 14a, 14b is relatively stable, so that the control unit 104 of the first body 10 accurately identifies the position of the positioning structures 14a, 14b on the first body 10 and reduces the probability of identifying errors of the control unit 104. Therefore, when the input device 12 is adjacent to the first body 10, the control unit 104 identifies the position of the input device 12 placed on the touch display area 100 by the positioning structures 14a, 14b.

Please refer to FIG. 4A. FIG. 4A is a bottom view of the structure shown in FIG. 2. As shown in FIG. 4A, the positioning structures 14a, 14b, 14c, and 14d are adjacent to the outer edge 120p of the casing 120 as shown in FIG. 3. Specifically, the bottom surface 120b of the casing 120 has two opposite long sides 131 and 132, and two opposite short sides 133 and 134. The positioning structures 14a, 14b, 14c and 14d are disposed on the bottom surface 120b of the casing 120. The positioning structures 14a and 14b are respectively located on two opposite sides of the long side 131. The positioning structures 14c and 14d are respectively located on two opposite sides of the long side 132. The positioning structures 14a and 14c are respectively located on two opposite sides of the short side 133. The positioning structures 14b and 14d are respectively located on two opposite sides of the short side 134.

As shown in FIG. 4B, the vertical projection of the positioning structure 14a on the bottom surface 120b of the casing 120 as shown in FIG. 4A is rectangular. In the embodiment, the extension direction of the long sides 131 and 132 of the bottom surface 120b as described in FIG. 4A is defined as direction X, and the extension direction of the short sides 133 and 134 of the bottom surface 120b is defined as direction Y. In the view of FIG. 4B, the width W1 of the positioning structure 14a along the direction X is greater than its width W2 along the direction Y, which is not limited thereto. In an embodiment, the width W1 of the positioning structure 14a is about 10 mm, and the width W2 is about 3 mm.

As shown in FIG. 4C, the vertical projection of the positioning structure 14a on the bottom surface 120b of the casing 120 as shown in FIG. 4A is circular, which is not limited thereto. In an embodiment, the diameter R of the positioning structure 14a is about 8 mm. In some embodiments, the vertical projection of the positioning structure 14a on the bottom surface 120b of the casing 120 is elliptical or any suitable shape.

Please refer to FIG. 3 and FIG. 4A. As shown in FIG. 3, the fixing structures 16a, 16b are disposed on the casing 120 of the input device 12 and protruding from the casing 120. In addition, the fixing structures 16a, 16b are disposed on a side of the input device 12 opposite to the input assembly 128. In FIG. 4A, the fixing structures 16a, 16b, 16c, and 16d are adjacent to the outer edge 120p of the casing 120. The fixing structures 16a and 16b are located on two opposite sides of the long side 131, and are respectively adjacent to the positioning structures 14a and 14b. The fixing structures 16c and 16d are located on two opposite sides of the long side 132 and are respectively adjacent to the positioning structures 14c and 14d. The fixing structures 16a and 16c are located on two opposite sides of the short side 133. The fixing structures 16b and 16d are located at two opposite sides of the short side 134.

Figure 6A:
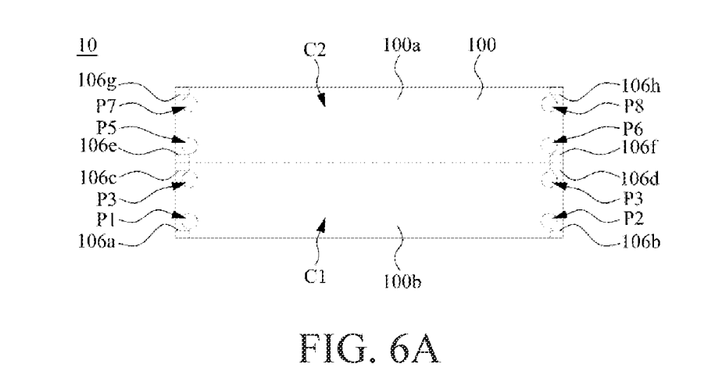
FIG. 6A is a top view of a display device according to an embodiment.

In FIG. 3, the first body 10 further includes a plurality of fixing components, such as fixing components 106a, 106b, 106c, 106d, 106e, 106f, 106g, and 106h, that showed in FIG. 6A. In the embodiment, the fixing components 106a, 106b of the first body 10 are configured to attract the fixing devices 16a and 16b of the input device 12 to detachably fix the input device 12 to the first body 10. In the embodiment, the fixing components 106a, 106b are made of attractive material. Therefore, the material of the fixing components 106a, 106b is magnetic material or metal material, which is not limited thereto. In practical applications, the fixing components 106a, 106b are any structures to mutually fix the input device 12 and the first body 10.

Thereby, the input device 12 is combined to a specific position on the first body 10 by the fixing structures 16a and 16b located thereon to improve the strength of the overall structure of the computer system 1, moreover, it prevents the input device 12 being moved relative to the first body 10 when the user uses the first body 10 or the input device 12. Furthermore, the user is allowed to place the input device 12 at a specific position on the first body 10 as needed, so as to improve the convenience of the computer system 1.

In FIG. 3, the positioning structure 14a and the fixing structure 16a respectively have a surface 140 and a surface 160 away from the casing 120 of the input device 12. The distance D1 between the surface 140 of the positioning structure 14a and the casing 120 is substantially the same as the distance D2 between the surface 160 of the fixing structure 16a and the casing 120. Thereby, when the input device 12 is placed on the first body 10, it is ensured that the positioning structure 14a on the input device 12 contacts the touch display area 100, so that the input device 12 is coupled to the first body 10.

Figure 5:
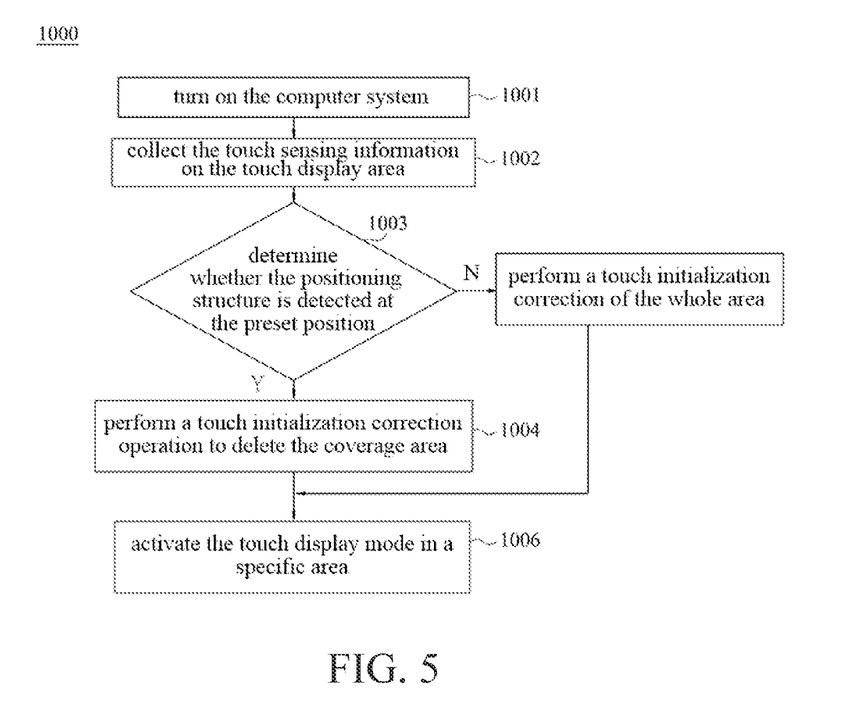
FIG. 5 is a flow chart showing the operation method of the computer system according to an embodiment.

In FIG. 5, the method 1000 disclosed herein is illustrated and described as a series of steps or events, but it should be understood that the order of such steps or events are drawn is not construed in a limiting sense. For example, some steps may occur in different orders or concurrently with other steps or events, except for in the order illustrated or described herein. In addition, the implementation of one or more aspects or embodiments described herein may not require all of the illustrated operations. Furthermore, one or more of the steps depicted herein may be implemented in one or more separate steps and/or stages. Specifically, the operation method 1000 includes steps 1001 to 1006.

In step 1001, turn on the computer system shown in FIG. 1.

Please refer to FIG. 3, in step 1002, collect the touch sensing information on the touch display area 100 by the control unit 104 in the first body 10.

In step 1003, determine whether the positioning structure is detected at the preset position. When the positioning structure is detected at the preset position, step 1004 is performed. In contrast, when the positioning structure is not detected at the preset position, step 1005 is performed. Please refer to FIG. 6A. FIG. 6A is a top view of a display device according to an embodiment of the present disclosure. The fixing components 106a to 106h in the first body 10 is disposed on both sides of the touch display area 100. Specifically, when the input device 12 as shown in FIG. 4A is placed on the first body 10 as shown in FIG. 6A, the fixing structures 16a, 16b, 16c, and 16d on the input device 12 are corresponding to the fixing components 106a, 106b, 106c, and 106d on the first body 10, to detachably fix the input device 12 to the lower side of the touch display area 100 of the first body 10, see FIG. 1.

Figure 6B:
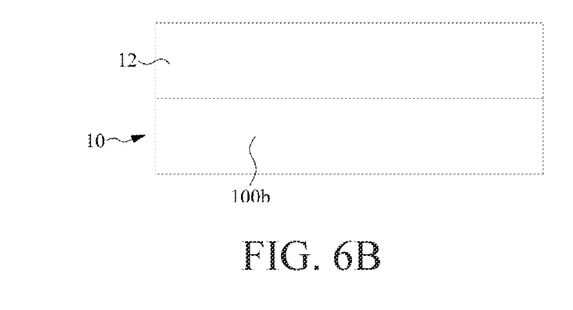
FIG. 6B is a partial structural view of a computer system in an assembled state according to an embodiment.

Alternatively, when the input device 12 as shown in FIG. 4A is placed on the first body 10 as shown in FIG. 6A, the fixing structures 16a, 16b, 16c and 16d on the input device 12 are corresponding to the fixing components 106e, 106f, 106g and 106h located in the first body 10, to detachably fix the input device 12 to the fixing component 106e, 106f, 106g and 106h in the first body 10, see FIG. 6B.

Furthermore, when the input device 12 is detachably fixed to the first body 10, the positioning structures 14a, 14b, 14c, and 14d located on the input device 12 as shown in FIG. 4A change the capacitance value of a specific position in the touch display area 100 as shown in FIG. 3.

In an embodiment, since the positioning structures 14a, 14b, 14c, and 14d shown in FIG. 4A are respectively adjacent to the fixing structures 16a, 16b, 16c, and 16d located on the input device 12, when the fixing structure 16a, 16b, 16c, and 16d are respectively fixed to the fixing components 106a, 106b, 106c, and 106d as shown in FIG. 6A, the positioning structures 14a, 14b, 14c, and 14d respectively generate touch sensing signals on the touch display area 100 at preset positions P1, P2, P3, and P4 adjacent to of the fixed components 106a, 106b, 106c, and 106d. The control unit 104 detects changes of capacitance at the preset positions P1, P2, P3, and P4 to determine that the input device 12 is placed on the lower side of the touch display area 100, and forms a corresponding coverage area C1 on the first body 10.

Similarly, when the control unit 104 detects changes of capacitance in preset positions P5, P6, P7, and P8 as shown in FIG. 6A, it determines that the input device 12 is placed on the upper side of the touch display area 100, and forms a corresponding coverage area C2 on the first body 10.

Figure 7:
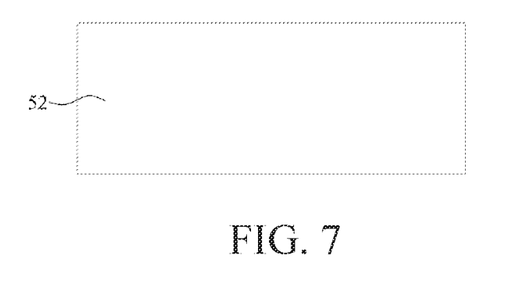
FIG. 7 is a partial structural top view of another computer system according to an embodiment.

Please refer to FIG. 7. The computer system 5 shown in FIG. 7 includes a display device, positioning structures, fixing structures (not shown in FIG. 7 by this view), fixing components (not shown in FIG. 7 by this view), and an input device 52. The structure and function of these components and the connection relationship between the components are substantially the same as those of the computer system 1 shown in FIG. 1 and FIG. 2, the related descriptions may be referred to, and details are not described herein again. The difference between this embodiment and the embodiments shown in FIG. 1 and FIG. 2 is that, in the embodiment, the computer system 5 replaces the input device 52 shown in FIG. 1 and FIG. 2. The input device 52 completely covers the touch display area 100 of the first body 10 as shown in FIG. 6A.

When the input device 52 is detachably fixed to the first body 10, the positioning structures on the input device 52 respectively generate touch sensing signals at the preset positions P1, P2, P7, and P8 of the touch display area 100. The preset positions P1, P2, P7, and P8 are adjacent to the fixed components 106a, 106b, 106g, and 106h respectively. The control unit 104 detects changes of capacitance at the preset positions P1, P2, P7, and P8 to determine whether the input device 52 completely covers the touch display area 100 of the first body 10 as shown in FIG. 6A.

In the present embodiment, the positioning structures 14a, 14b, 14c, and 14d as shown in FIG. 4A only appear in the preset positions P1, P2, P3, P4, P5, P6, P7 and P8, as shown in FIG. 6A, therefore, when detecting the positioning structures 14a, 14b, 14c, and 14d, the control unit 104 only needs to detect the preset positions P1, P2, P3, P4, P5, P6, P7, and P8 to confirm whether the input device is placed on the first body 10, which improves the processing speed of the control unit 104.

In step 1004, perform a touch initialization correction operation to delete the coverage area. Specifically, the control unit 104 as shown in FIG. 3 calculates the coverage area of the input device 12 at the touch display area 100 based on the positions on the first body 10 respectively corresponding to the positioning structures 14a, 14b, 14c, and then the control unit 104 determines the range of the display area of the touch display area 100 based on the coverage area of the input device 12.

For example, in FIG. 1, the control unit 104 determines that the input device 12 is placed on the lower side of the touch display area 100. In an embodiment, the control unit 104 calculates the coverage area C1 covered by the input device 12 on the touch display area 100 (see FIG. 6A), and determines the range of the display area 100a of the touch display area 100 based on the coverage area C1 covered by the input device 12 on the touch display area 100. The display area 100a of the touch display area 100 is an area of the touch display area 100 without being covered by the input device 12. Therefore, the control unit 104 limits the first body 10 to display images in the display area 100a.

Similarly, in FIG. 6B, when the control unit 104 determines that the input device 12 is placed on the upper side of the touch display area 100, the control unit 104 calculates the coverage area C2 covered by the input device 12 on the touch display area 100 (see FIG. 6A), and determines the range of the display area 100b of the touch display area 100 based on the coverage area C2 covered by the input device 12 on the touch display area 100. The display area 100b of the touch display area 100 is an area of the touch display area 100 without being covered by the input device 12, therefore, the control unit 104 limits the first body 10 to display images in the display area 100a.

However, in FIG. 7, when the control unit 104 determines that the input device 52 completely covers the touch display area 100 of the first body 10 as shown in FIG. 6A, the control unit 104 is configured to control the touch display area 100 not to display any image.

In step 1005, perform a touch initialization correction of the whole area. When the control unit 104 of the first body 10 does not detect any one of the positioning structures 14a, 14b, 14c or 14d of the input device 12 on the preset positions P1, P2, P3, P4, P5, P6, P7 or P8 as shown in FIG. 6A, the control unit 104 determines that the input device 12 is not placed on the first body 10. At this time, the control unit 104 controls the entire touch display area 100 of the first body 10 to be the touch display area.

In step 1006, the touch display mode is activated in a specific area determined by the control unit 104, or the touch display mode of the first body 10 is turned off.

From the above detailed description of the specific embodiments, it is obvious that the positioning structures of the input device are electrically connected to the grounding piece of the input device, thereby the problem of poor recognition ability caused by the floating effect of the positioning structure is improved. When the input device is placed on the touch display device, the change of capacitance on the touch sensing layer caused by the improved positioning structures is relatively stable, so that the control unit in the touch display device accurately determines the position of the positioning structure on the touch display device. Therefore, when the input device is close to the touch display device, the control unit can determines the position where the input device is placed by the positioning structure.

In addition, the input device can be disposed on a specific position of the touch display device by the fixing structures located thereon to prevent the input device to be moved relative to the touch display device when the user uses the touch display device or the input device. Furthermore, the user can also place the input device on a specific position of the touch display device as his required, so as to improve the convenience of the computer system.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An input device computer system, comprising:
   an electronic device, including a touch display area and a control unit;
   an input element, including a casing and a plurality of positioning structures, wherein the casing comprises a top plate, a bottom plate, and a grounding piece between the top and bottom plates, the positioning structures are made of a conductive rubber and in directly physical contact with a bottom surface of the grounding piece, the positioning structures protrude downwardly from the grounding piece and penetrates through the bottom plate of the casing to an outside of the casing, and when viewed in a cross section, at least one of the positioning structures has a curved bottom surface; and a fixing structure comprising a first magnetic material and protruding downwardly from a bottom surface of the bottom plate of the casing, wherein when viewed in the cross section, the fixing structure has a flat bottom surface level with a bottommost position of the curved bottom surface of the at least one of the positioning structures;

wherein, when the input element is disposed on the touch display area of the electronic device, the control unit detects positions of the positioning structures on the touch display area, calculates a coverage area covered by the input element on the touch display area according to the positions, and determines a range of a display area of the touch display area according to the coverage area.

2. The input device according to claim 1, wherein the input element includes a circuit board, the input element being above and electrically connected to the grounding piece.

3. The input device according to claim 1, wherein the input element includes an input assembly disposed on the top plate of the casing.

4. The input device according to claim 1, wherein the positioning structures are adjacent to an outer edge of the input element.

5. The input device according to claim 1, wherein the electronic device further includes a fixing component which configured to attract the fixing structure, and to detachably fix the input element to the electronic device.

6. The input device according to claim 5, wherein the fixing components is made of a second magnetic material.

* * * * *